(12) United States Patent
Wang et al.

(10) Patent No.: US 12,111,668 B2
(45) Date of Patent: Oct. 8, 2024

(54) WATER FLOW RATE AUTOMATIC CONTROL MODULE

(71) Applicant: HUIDA SANITARY WARE CO., LTD., Tangshan (CN)

(72) Inventors: Yanqing Wang, Tangshan (CN); Cuijie Wang, Tangshan (CN); Zichun Song, Tangshan (CN)

(73) Assignee: HUIDA SANITARY WARE CO., LTD., Tangshan (CN)

( * ) Notice: Subject to any disclaimer, the term of this patent is extended or adjusted under 35 U.S.C. 154(b) by 256 days.

(21) Appl. No.: 17/790,531

(22) PCT Filed: Dec. 25, 2020

(86) PCT No.: PCT/CN2020/139533
§ 371 (c)(1),
(2) Date: Jul. 1, 2022

(87) PCT Pub. No.: WO2021/143492
PCT Pub. Date: Jul. 22, 2021

(65) Prior Publication Data
US 2023/0035684 A1     Feb. 2, 2023

(30) Foreign Application Priority Data
Jan. 16, 2020   (CN) .......................... 202010045963.9

(51) Int. Cl.
*G05D 23/02*    (2006.01)
*F16K 11/04*    (2006.01)
(Continued)

(52) U.S. Cl.
CPC ............ *G05D 23/022* (2013.01); *F16K 11/04* (2013.01); *F16K 31/002* (2013.01); *G05D 23/1333* (2013.01)

(58) Field of Classification Search
CPC ..... F16K 11/04; F16K 31/002; G05D 23/022; G05D 23/024; G05D 23/025; G05D 23/1333
See application file for complete search history.

(56) References Cited

U.S. PATENT DOCUMENTS 10,191,500 B2    1/2019   Akita et al.

FOREIGN PATENT DOCUMENTS

CN         2619109 Y       6/2004
CN         201547280 U     8/2010
(Continued)

OTHER PUBLICATIONS

SE 516804 (English Translaion) (Year: 2002).*
(Continued)

*Primary Examiner* — Jonathan Bradford

(57) ABSTRACT

A water flow rate automatic control module includes a base, a valve body, a thermosensitive assembly, a diaphragm, wherein a temperature sensing part senses the temperature of passing cold water in real time; when the temperature of cold water is too low, the mixed water flow rate is slowed down, and more hot water is supplied to a thermostatic valve core assembly for mixing; when the temperature of cold water is too high, the mixed water flow rate is increased, and more cold water is supplied to the thermostatic valve core assembly for mixing. Therefore, the mixed water temperature range of the thermostatic valve core assembly can be ensured, and the problem of temperature adjustment failure or beyond the temperature difference caused by matching the thermostatic shower with a gas water heater is solved.

2 Claims, 8 Drawing Sheets

(51) Int. Cl.
*F16K 31/00* (2006.01)
*G05D 23/13* (2006.01)

(56) References Cited

FOREIGN PATENT DOCUMENTS

| CN | 206206603 U | 5/2017 |
| CN | 110319593 A | 10/2019 |
| CN | 111140676 A | 5/2020 |
| CN | 211779176 U | 10/2020 |
| EP | 1906102 B1 | 1/2017 |
| WO | 2005078359 A | 8/2005 |

OTHER PUBLICATIONS

International Search Report issued in corresponding International application No. PCT/CN2020/139533, mailed Mar. 10, 2021.
Written Opinion of the International Searching Authority for No. PCT/CN2020/139533.
Initial Publication For PCT/CN2020/139533.
European search report, Application No. 20914081.3-1205, date Dec. 19. 2022 (7 pages).

* cited by examiner

WATER FLOW RATE AUTOMATIC CONTROL MODULE

CROSS-REFERENCE TO RELATED APPLICATIONS

This application is a United States National Stage of International Application No. PCT/CN2020/139533, filed Dec. 25, 2020, which claims the benefit of priority of Chinese Patent Application Serial No. CN202010045963.9, filed on Jan. 16, 2020, the disclosure of all of which are hereby incorporated by reference in their entirety.

FIELD

The present invention relates generally to the field of thermostatic shower fittings, in particular to a water flow rate automatic control module.

BACKGROUND

Water in a gas water heater is mainly heated by burning natural gas. The gas water heater with a low number of liters cannot burn tap water to a standard mixing temperature when the tap water temperature is low in winter, and can easily burn the water temperature to a super-standard temperature when the tap water temperature is high in summer, which leads to customer complaints due to temperature regulation failure or large temperature difference by matching the thermostatic shower with a gas water heater.

SUMMARY

The technical problem to be solved by the invention is directed to overcome the defects in the prior art and provide a water flow rate automatic control module which automatically adjusts the flow of warm water according to the temperature of cold water so as to stabilize the water outlet temperature.

The present invention is realized by the following technical solutions.

A water flow rate automatic control module comprises a base, a valve body, a thermosensitive assembly and a diaphragm;

wherein the base is hermetically connected with the lower end of the valve body, a cold water cavity is enclosed between the base and the valve body, and the side wall of the valve body is provided with a cold water passing hole communicated with the cold water cavity; the upper end of the valve body is hermetically connected with an end cover, a warm water cavity is enclosed between the end cover and the valve body, and a supporting tube coaxially and fixedly connected with the valve body is arranged in the warm water cavity; and the side wall of the upper section of the valve body is provided with a warm water inlet hole, the side wall of the middle of the valve body is provided with a warm water outlet hole, a side water passage communicated with the warm water inlet hole and the warm water outlet hole is arranged between the inner wall of the valve body and the supporting tube;

the middle part of the thermosensitive assembly is detachably and hermetically connected with the valve body; the thermosensitive assembly comprises a temperature sensing part and a moving rod inserted into the temperature sensing part, the temperature sensing part is arranged in the cold water cavity, and the free end of the moving rod is fixedly connected with a diaphragm support; the diaphragm support is arranged in the warm water cavity and is arranged above the supporting tube, a buckle cover is detachably connected to the diaphragm support, and the diaphragm is arranged between the diaphragm support and the buckle cover; and a return spring enabling the diaphragm to be in close contact with the upper end of the supporting tube is arranged between the buckle cover and the end cover.

Preferably, a limit groove is provided at the upper end inside the end cover, and a limit protrusion corresponding to the limit groove is provided at the upper end of the buckle cover.

The present invention has the following beneficial effects.

The temperature sensing part senses the temperature of passing cold water in real time; when the temperature of cold water is too low, the mixed water flow rate is slowed down, and more hot water is supplied to a thermostatic valve core for mixing; when the temperature of cold water is too high, the mixed water flow rate is increased, and more cold water is supplied to the thermostatic valve core for mixing; therefore, the mixed water temperature range of the thermostatic valve core can be ensured, and the problem of temperature adjustment failure or beyond the temperature difference caused by matching the thermostatic shower with a gas water heater is solved.

BRIEF DESCRIPTION OF THE DRAWINGS

In order to explain the embodiments of the present invention or the technical solutions in the prior art more clearly, the following will briefly introduce the drawings that need to be used in the description of the embodiments or the prior art. Obviously, the drawings in the following description are only some embodiments of the present invention. For those of ordinary skill in the art, other drawings can be obtained based on these drawings without creative work.

Figure 1:
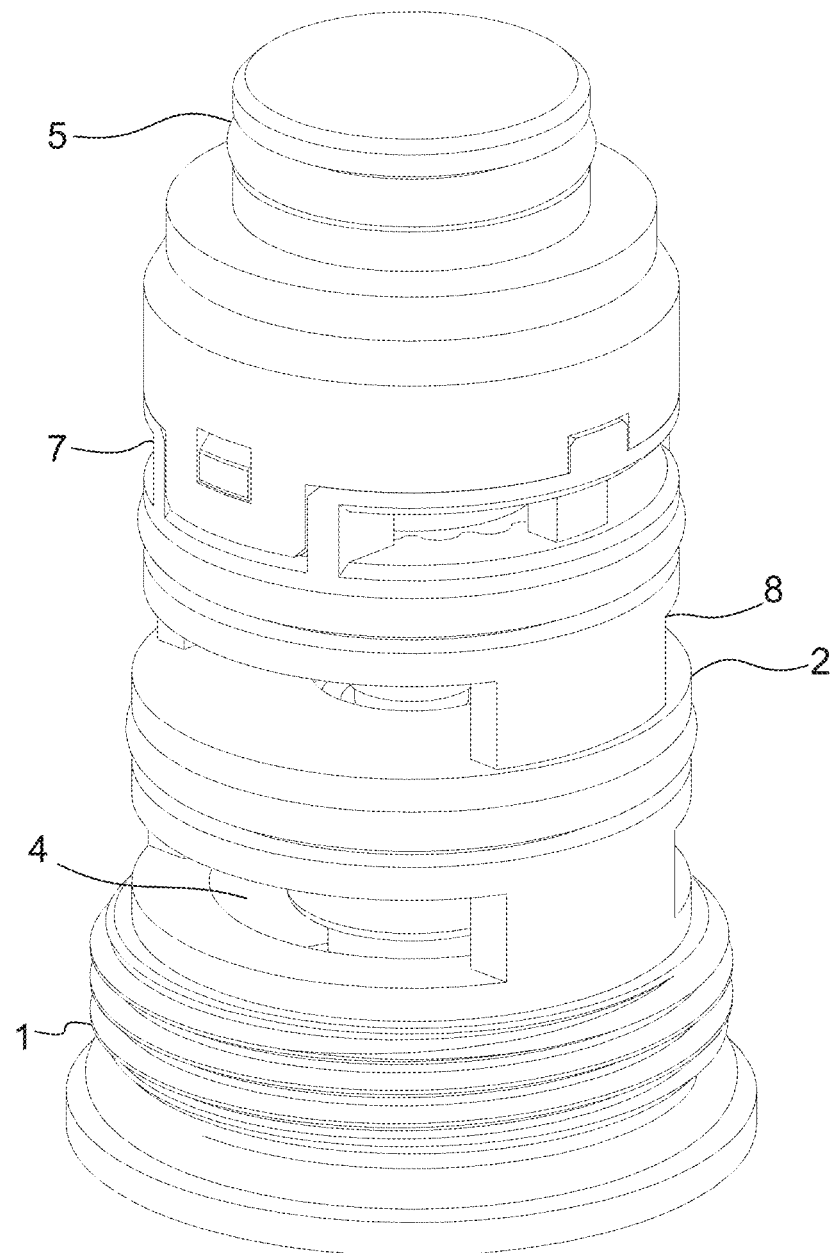
FIG. 1 is a structurally front view of the present invention.
Figure 2:
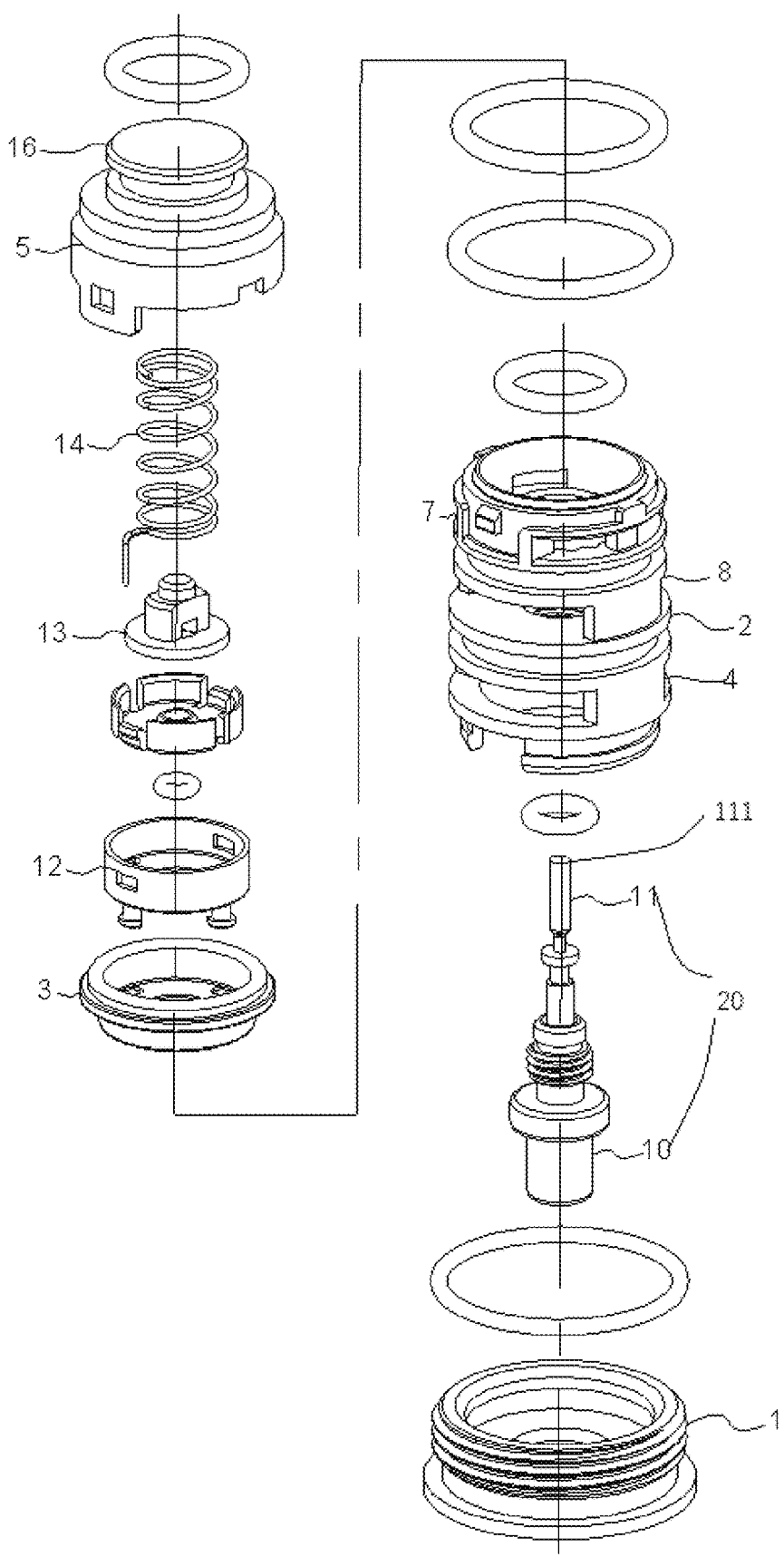
FIG. 2 is an assembly structure view of the present invention.
Figure 3:
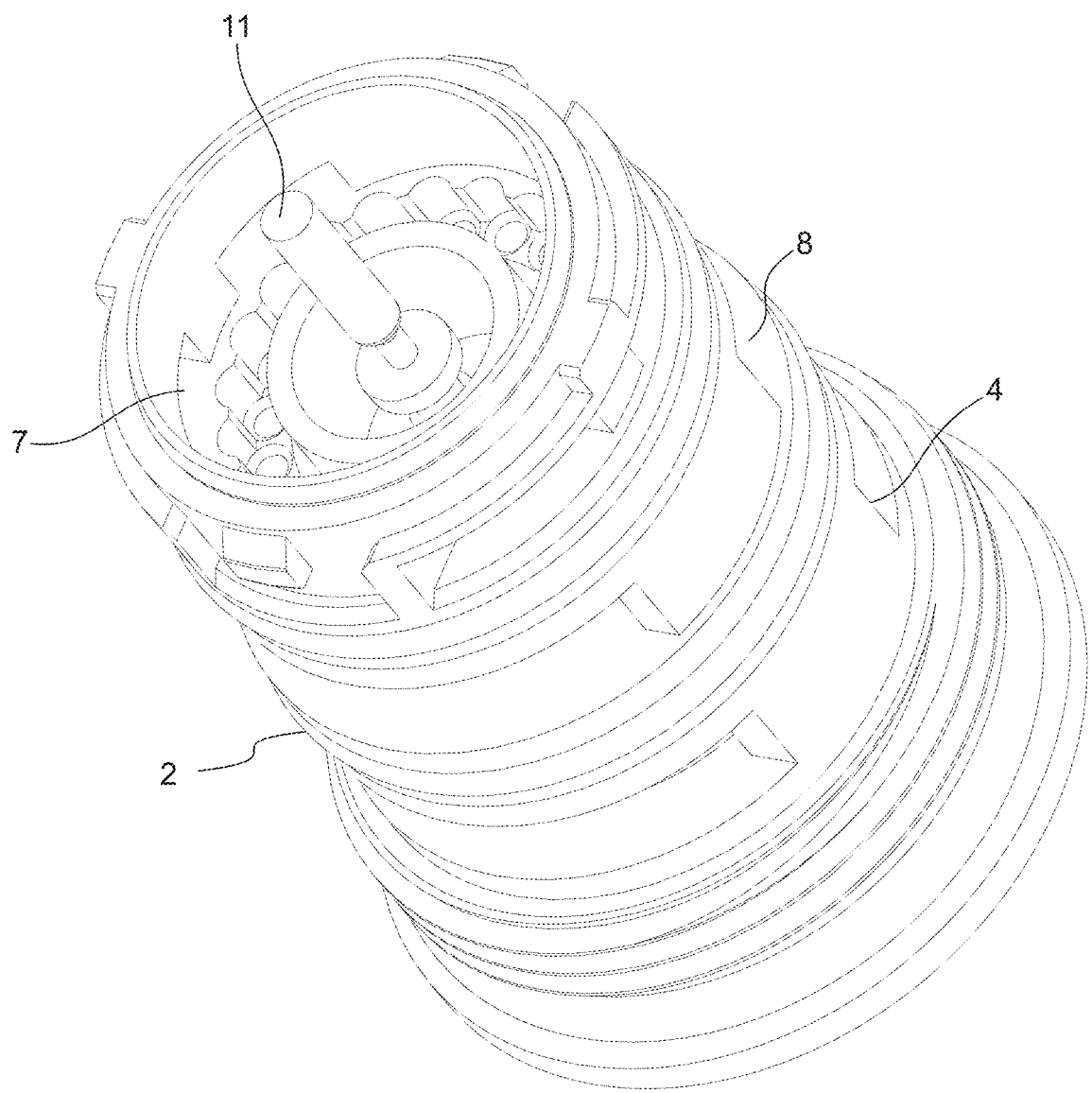
FIG. 3 is a perspective structure view of the present invention.
Figure 4:
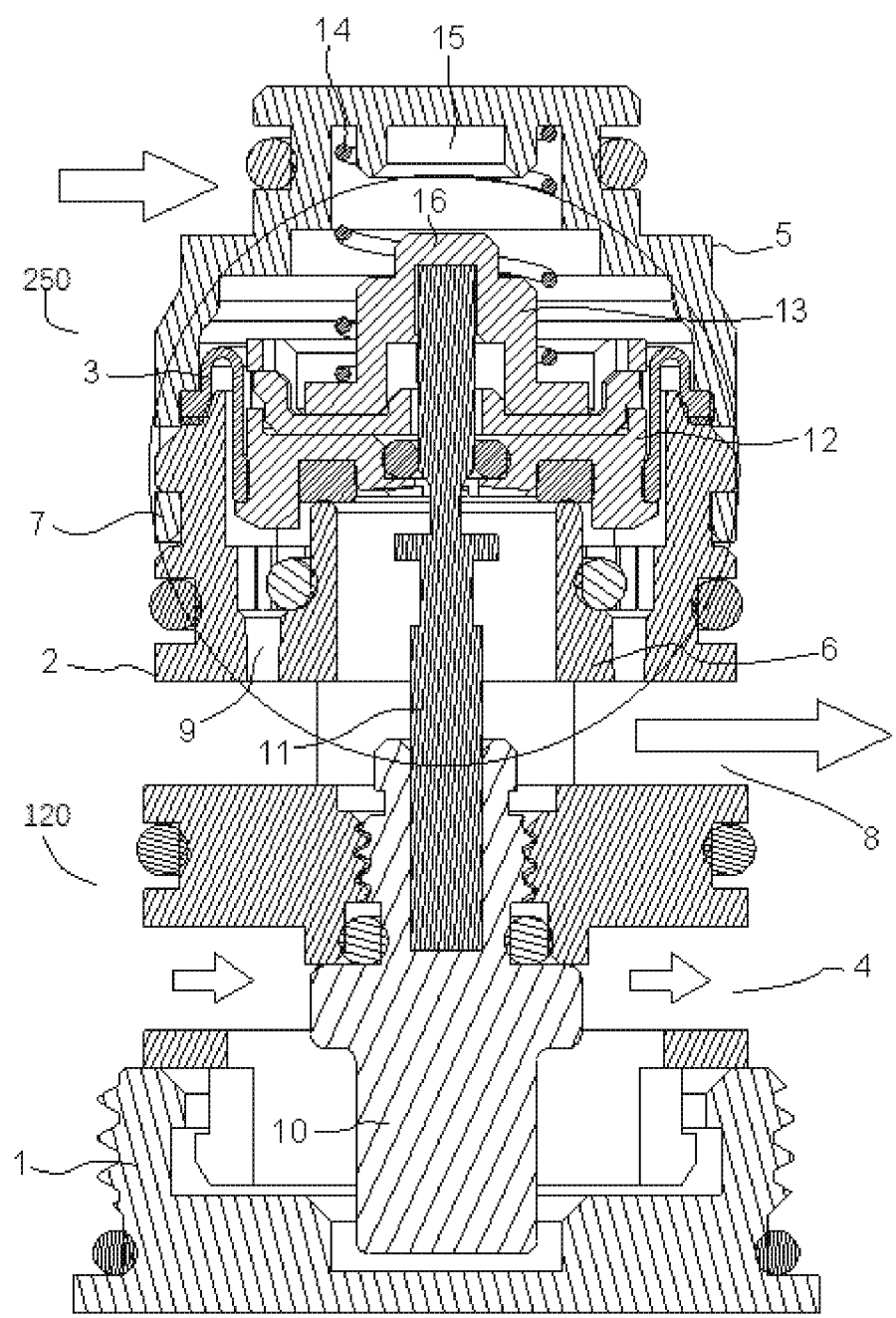
FIG. 4 is a cross-sectional structure view of the present invention.
Figure 5:
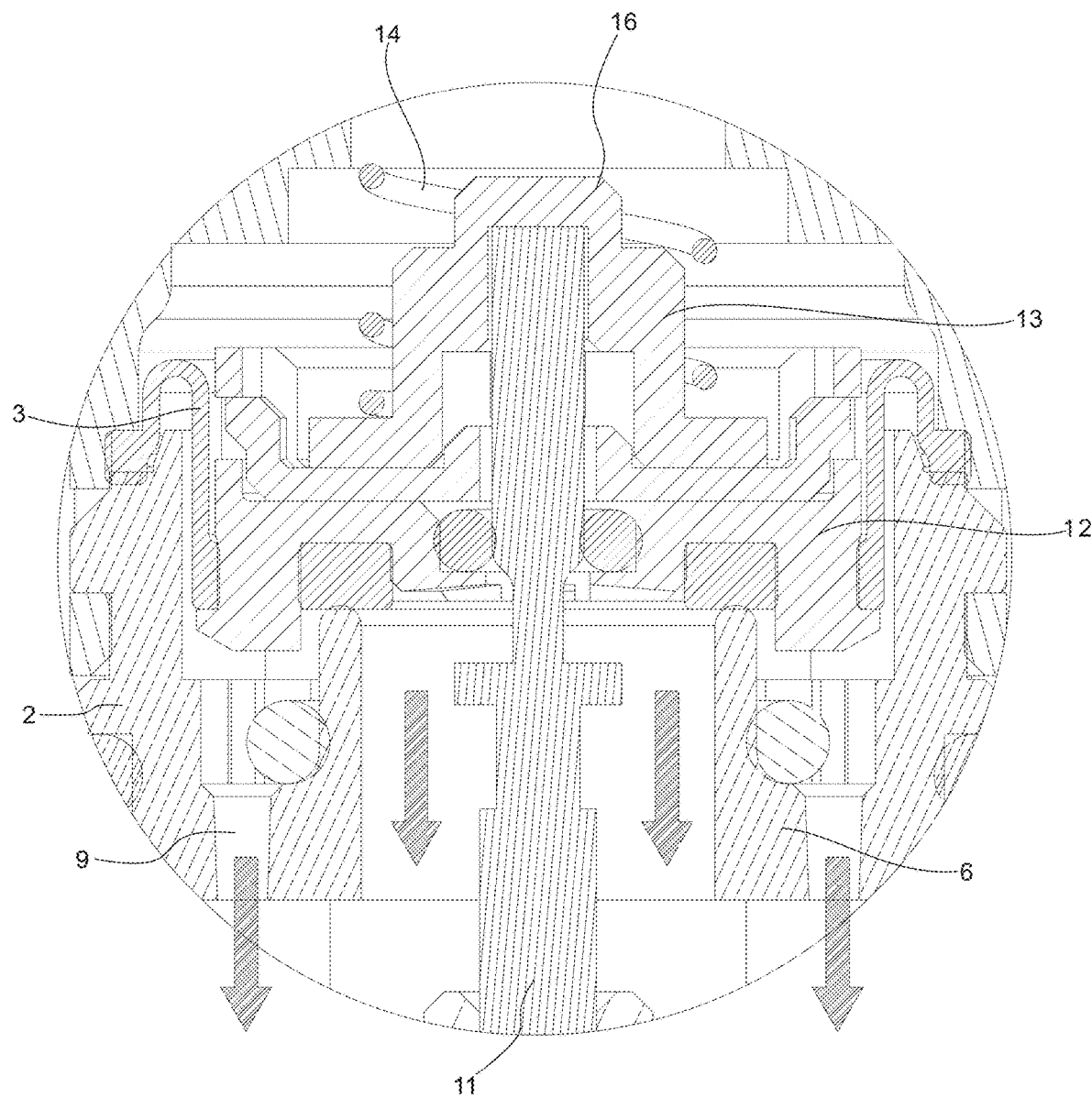
FIG. 5 is a partially enlarged view of the present invention.

In the drawings: 1. a base; 120. a cold water tank; 2. a valve body; 250. a warm water tank; 3. a diaphragm; 4. a cold water passing hole; 5. an end cover; 6. a supporting tube; 7. a warm water inlet hole; 8. a warm water outlet hole; 9. a side water passage; 10. a temperature sensing part; 11. a moving rod; 111. a free end of the moving rod; 12. a diaphragm support; 13. a buckle cover; 14. a return spring; 15. a limit groove; 16, a limit protrusion; 17. a thermostatic valve core assembly; 18. a cold water passage; 19, a hot water passage; and 20. a thermosensitive assembly.

DETAILED DESCRIPTION

In order that those skilled in the art may better understand the technical solutions of the present invention, the present invention will be described in further detail with reference to the accompanying drawings and preferred embodiments.

As shown in FIGS. 1-8, the present invention includes a base 1, a valve body 2, a thermosensitive assembly 20 and a diaphragm 3.

The base 1 is hermetically connected with the lower end of the valve body 2, a cold water cavity 120 is enclosed between the base 1 and the valve body 2, and the side wall of the valve body 2 is provided with a cold water passing hole 4 communicated with the cold water cavity; the upper end of the valve body 2 is hermetically connected with an end cover 5, a warm water cavity 250 is enclosed between the end cover 5 and the valve body 2, and a supporting tube 6 coaxially and fixedly connected with the valve body 2 is arranged in the warm water cavity 250; and the side wall of the upper section of the valve body 2 is provided with a warm water inlet hole 7, the side wall of the middle of the valve body 2 is provided with a warm water outlet hole 8, and a side water passage 9 communicated with the warm water inlet hole 7 and the warm water outlet hole 8 is arranged between the inner wall of the valve body 2 and the supporting tube.

Figure 6:
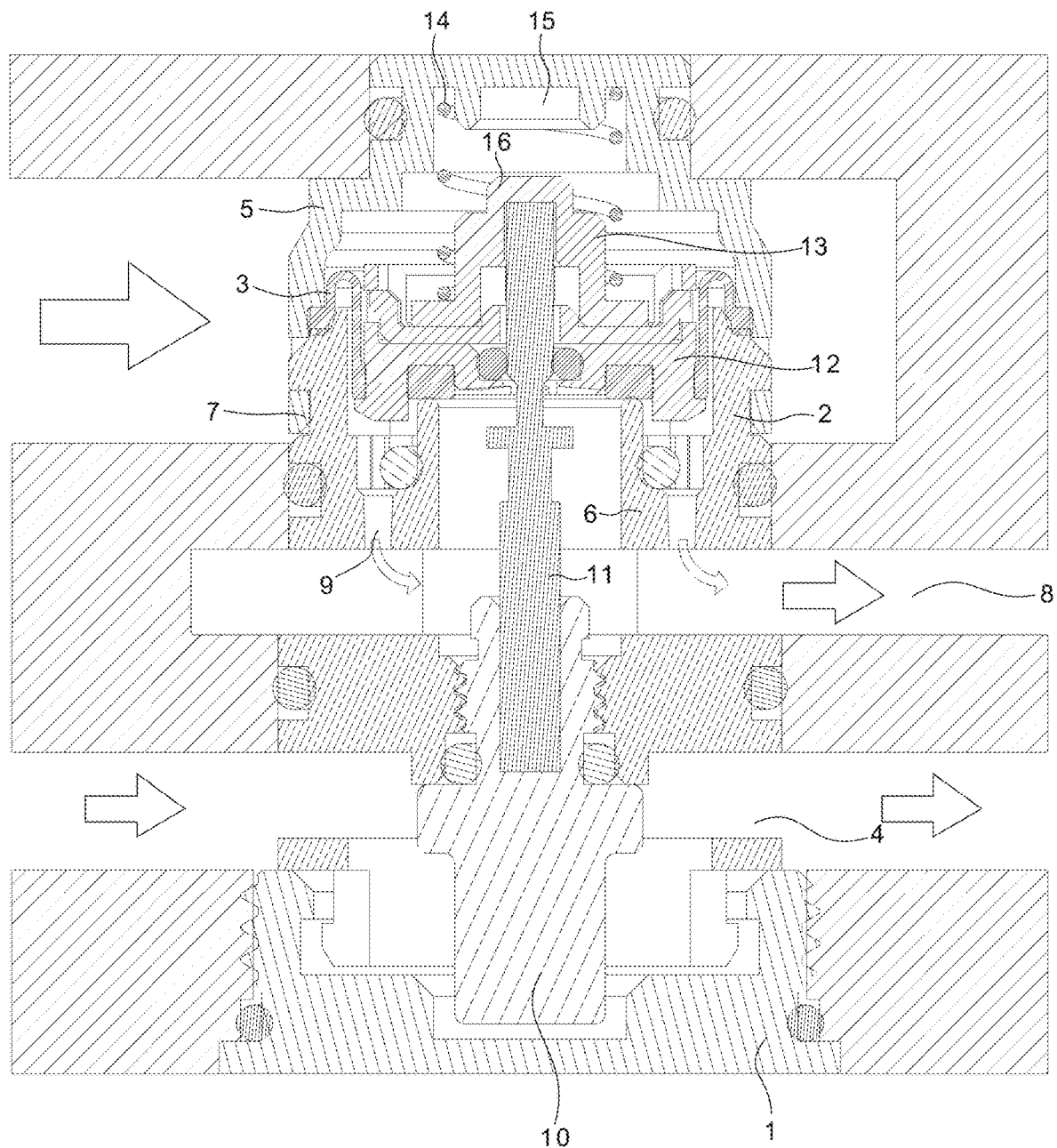
FIG. 6 is a structure view of an embodiment of the present invention.
Figure 7:
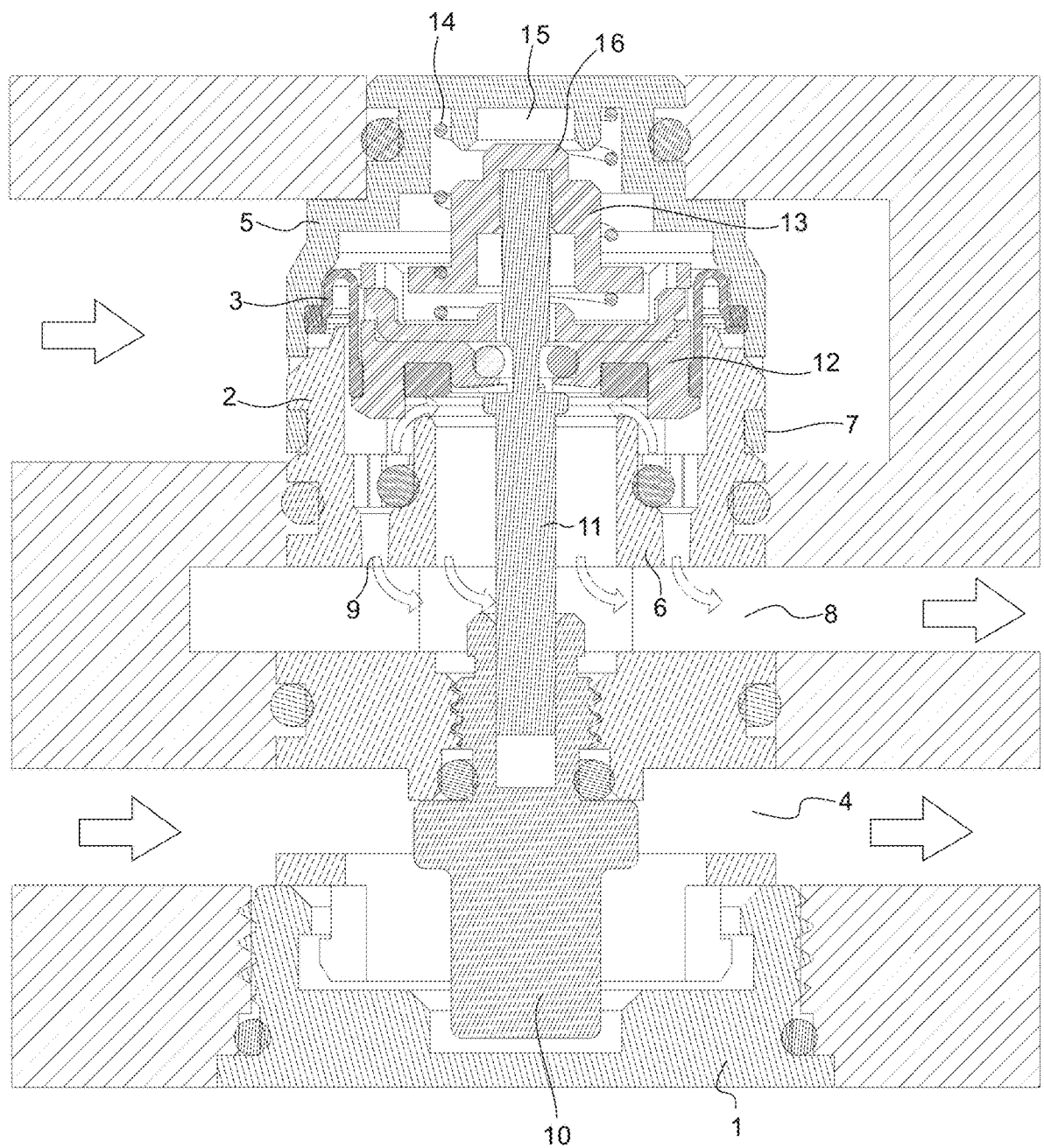
FIG. 7 is a structure view of an embodiment of the present invention.
Figure 8:
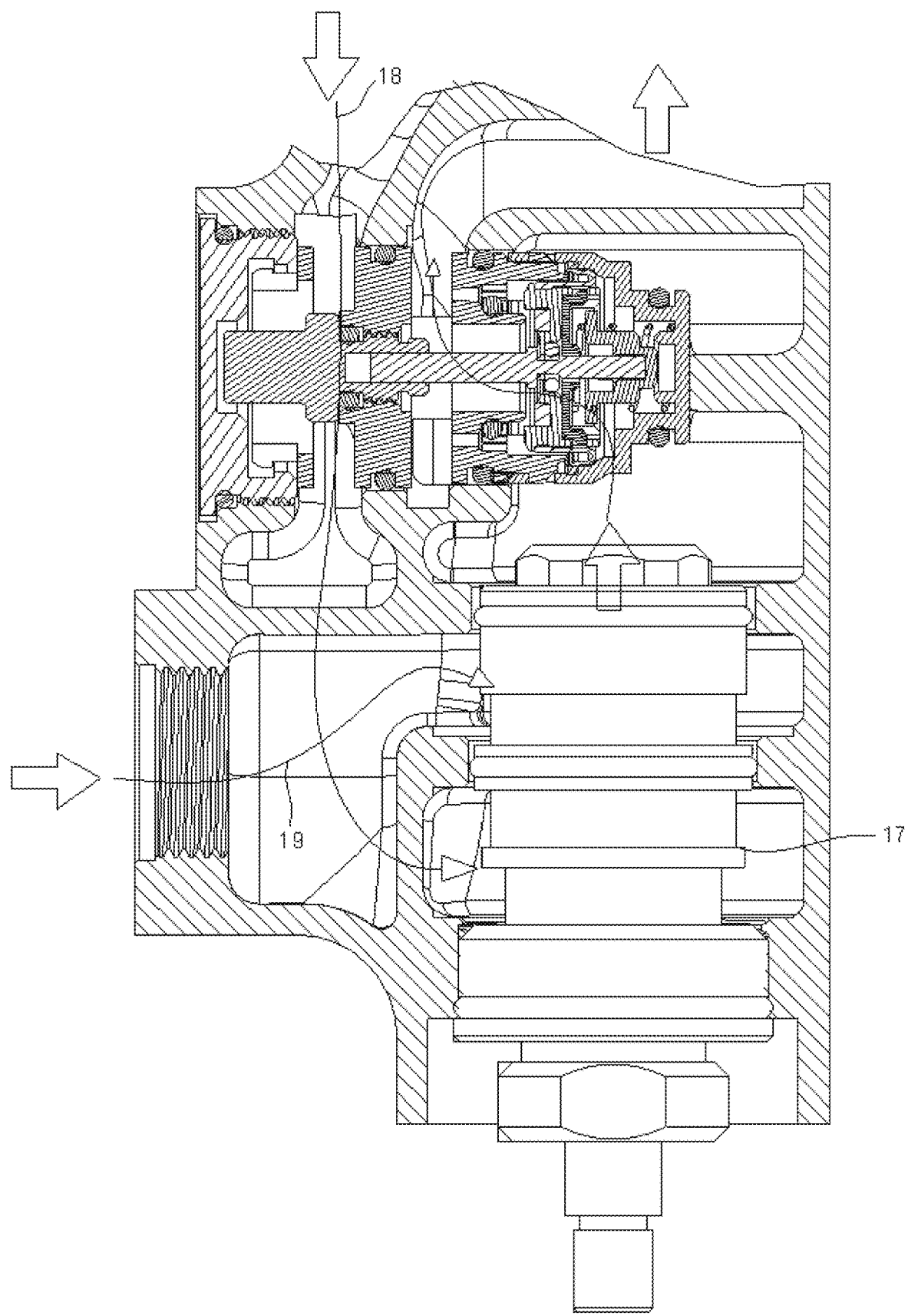
FIG. 8 is a use state reference diagram of the present invention.

The middle part of the thermosensitive assembly 20 is detachably and hermetically connected with the valve body 2, the thermosensitive assembly 20 is a commercial product and comprises a temperature sensing part 10 and a moving rod 11 inserted into the temperature sensing part 10, a temperature sensing material is filled between the temperature sensing part 10 and the moving rod 11, the temperature sensing material expands or contracts when subjected to temperature change, and the moving rod 11 stretches or contracts in the temperature sensing part 10; the temperature sensing part 10 is arranged in the cold water cavity 120, and the free end 111 of the moving rod is fixedly connected with a membrane support 12; the membrane support 12 is arranged in the warm water cavity 250 and is arranged above the supporting tube 6, and a buckle cover 13 is detachably connected to the membrane support 12, and the diaphragm 3 is arranged between the diaphragm support 12 and the buckle cover 13; and a return spring 14 enabling the diaphragm 3 to be in close contact with the upper end of the supporting tube 6 is arranged between the buckle cover 13 and the end cover 5. As shown in FIG. 8, when the flow module in the embodiment is mounted on a thermostatic shower, the cold water passing hole 4 enables the cold water cavity 120 communicated with the cold water passage 18; a thermostatic valve core assembly 17 is arranged in the thermostatic shower, two inlet ends of the thermostatic valve core assembly 17 are respectively communicated with the cold water passage 18 and a hot water passage 19, hot water and cold water are mixed in the thermostatic valve core assembly 17 to form warm water, and an outlet end of the thermostatic valve core assembly 17 is communicated with the warm water inlet hole 7 of the flow module in the embodiment. As shown in FIG. 6, when the cold water temperature is too low, the temperature sensing part senses the cold water temperature to enable the moving rod 11 to contract, and the moving rod 11 drives the diaphragm support 12 to enable the gap between the diaphragm 3 and the upper end of the supporting tube 6 to be reduced or even completely closed, so that the instantaneous flow of the warm water in the flow module is reduced. Due to the action of thermostatic valve core assembly 17, the flow rate of the cold water entering the thermostatic valve core assembly 17 is reduced; when the hot water is mixed with the cold water, the proportion of the hot water is relatively increased, so that the temperature of the warm water is prevented from being reduced due to the fact that the temperature of the cold water is too low, and the temperature of the warm water is maintained in a proper range. On the contrary, as shown in FIG. 7, when the cold water temperature is too high, the temperature sensing part senses the cold water temperature, the moving rod 11 is extended, and the moving rod 11 drives the diaphragm 3 to increase the gap between the diaphragm 3 and the upper end of the supporting tube 6; warm water can flow to the warm water outlet hole 7 from the side water passage 9, and can flow to the warm water outlet hole 7 from the gap between the diaphragm 3 and the upper end of the supporting tube 6, so that the instantaneous flow of warm water in the flow module of this embodiment is increased; the flow of the cold water entering the thermostatic valve core assembly 17 is increased due to the action of the thermostatic valve core assembly 17 and the increase of the flow of the warm water, and the proportion of the cold water is relatively increased when the hot water and the cold water are mixed, so that the increase of the temperature of the warm water caused by the over high temperature of the cold water is avoided, and the temperature of the warm water is maintained in a proper range.

Preferably, a limiting groove 15 is provided at the upper end inside the end cover 5, and a limit protrusion 16 corresponding to the limit groove 15 is provided at the upper end of the buckle cover 13, which achieves the guiding and limiting functions when the moving rod 11 moves outwards to a limiting position.

The above mentioned are only preferred embodiments of the present invention and are not intended to limit the present invention. For those skilled in the art, the present invention can have various modifications and changes. Any modification, equivalent substitution and improvement made within the spirit and principles of the present invention shall be covered by the protection scope of the present invention.

The invention claimed is:

1. A water flow rate automatic control module, comprising a base, a valve body, a thermosensitive assembly and a diaphragm;

wherein the base is hermetically connected with a first end arranged at a bottom of the valve body, a cold water cavity is enclosed between the base and the valve body, and a side wall of the valve body is provided with a cold water passing hole communicated with the cold water cavity; a second end arranged at a top of the valve body is hermetically connected with an end cover, a warm water cavity is enclosed between the end cover and the valve body, and a supporting tube coaxially and fixedly connected with the valve body is arranged in the warm water cavity; and the side wall is between the two ends of the valve and is also provided with a warm water inlet hole and a warm water outlet hole, the warm water outlet hole is located above the cold water passing hole, the warm water outlet hole is located below the warm water inlet hole, a side water passage communicated with the warm water inlet hole and the warm water outlet hole is arranged between an inner wall of the valve body and the supporting tube;

the thermosensitive assembly is detachably and hermetically connected with the valve body; the thermosensitive assembly comprises a temperature sensing part and a moving rod inserted into the temperature sensing part, the temperature sensing part is arranged in the cold water cavity, and a free end of the moving rod is fixedly connected with a diaphragm support; the diaphragm support is arranged in the warm water cavity and is arranged above the supporting tube, a buckle cover is detachably connected to the diaphragm support, and the diaphragm is arranged between the diaphragm support and the buckle cover; and a return spring enabling the diaphragm to be in contact with a top of the supporting tube is arranged between the buckle cover and the end cover.

2. The water flow rate automatic control module according to claim 1, wherein a limit protrusion is provided at a top of the buckle cover, and a limit groove corresponding to the limit protrusion is provided at an inside of the end cover.

* * * * *